United States Patent
Okada

(10) Patent No.: US 12,207,126 B2
(45) Date of Patent: Jan. 21, 2025

(54) COMMUNICATION APPARATUS, NETWORK MANAGEMENT APPARATUS, AND COMMUNICATION METHOD

(71) Applicant: RAKUTEN MOBILE, INC., Tokyo (JP)

(72) Inventor: Yoshimi Okada, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/774,194

(22) PCT Filed: Dec. 22, 2021

(86) PCT No.: PCT/JP2021/047495
§ 371 (c)(1),
(2) Date: Jun. 29, 2023

(87) PCT Pub. No.: WO2023/119466
PCT Pub. Date: Jun. 29, 2023

(65) Prior Publication Data
US 2024/0172034 A1    May 23, 2024

(51) Int. Cl.
*G06F 15/173* (2006.01)
*H04L 47/2475* (2022.01)
*H04W 28/02* (2009.01)

(52) U.S. Cl.
CPC ..... *H04W 28/0263* (2013.01); *H04L 47/2475* (2013.01)

(58) Field of Classification Search
CPC ...................... H04W 28/0263; H04L 47/2475
USPC .......................................................... 709/224
See application file for complete search history.

(56) References Cited

U.S. PATENT DOCUMENTS

| | | | |
|---|---|---|---|
| 2020/0245296 A1 | 7/2020 | Kimura et al. | |
| 2021/0120484 A1* | 4/2021 | Thorat | H04W 28/0268 |
| 2023/0370899 A1* | 11/2023 | Geng | H04L 12/4641 |

FOREIGN PATENT DOCUMENTS

| | | |
|---|---|---|
| JP | 2018-186450 A | 11/2018 |
| WO | 2019/065059 A1 | 4/2019 |

* cited by examiner

*Primary Examiner* — Alan S Chou
(74) *Attorney, Agent, or Firm* — Sughrue Mion, PLLC

(57) ABSTRACT

The communication apparatus (2) comprises a setting unit (32) configured to set slice information for identifying a type of a network slice in a Flow Label field in a header of a packet compliant with the IPv6 protocol, and a transmitting unit (33) configured to transmit the packet with the header set by the setting unit.

12 Claims, 7 Drawing Sheets

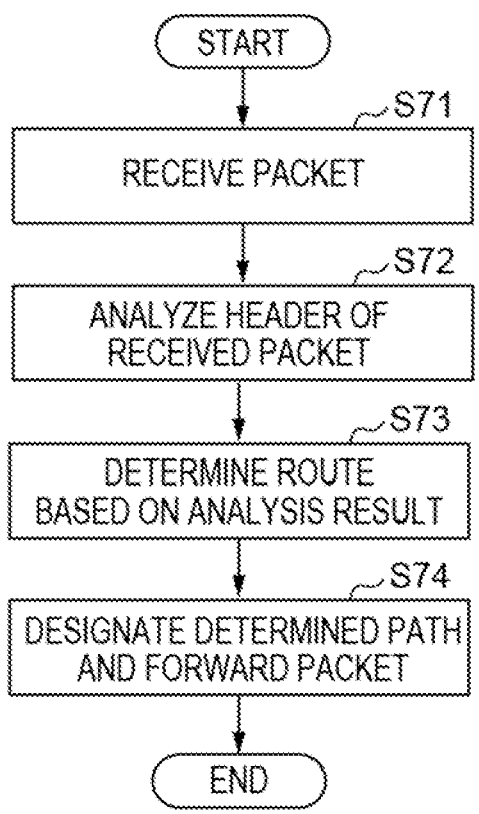

COMMUNICATION APPARATUS, NETWORK MANAGEMENT APPARATUS, AND COMMUNICATION METHOD

CROSS REFERENCE TO RELATED APPLICATIONS

This application is a National Stage of International Application No. PCT/JP2021/047495 filed Dec. 22, 2021.

TECHNICAL FIELD

The present invention relates to a communication control technology in a communication system where network slicing is applied.

BACKGROUND ART

In the Third Generation Partnership Project (3GPP), the Fifth Generation (5G) mobile communication system standard called the New Radio (NR) has been developed. In the 5G, the specifications for a slicing technology have been formulated in which a network is virtually divided into multiple network slices and communication services are provided in each network slice. An apparatus in the network may be configured, for example, to be capable of managing slice information and convey it.

A communication control apparatus disclosed in Patent Literature 1 is configured to store transmission control information included in packet from a communication terminal and the slice type in association with each other in advance. When the communication control apparatus receives a packet from the communication terminal, it determines a slice based on the transmission control information included in the packet and performs communication control accordingly.

LISTING OF REFERENCES

Patent Literature

PATENT LITERATURE 1: Laid-open Publication of Japanese patent Application No. 2018-186450 A

SUMMARY OF THE INVENTION

Problems to be Solved by the Invention

The relationship between the transmission control information and the slice type is not fixed and could be variable. So, in the method disclosed in the literature, a versatility of a system would be impaired with respect to slice type communication due to the setting in advance of an association between the information and the slice type.

The present invention has been made in order to the above mentioned problems and an object thereof is to provide a technique for improving a versatility in communicating a type of a network slice in a communication system to which network slicing is applied.

Solution to Problems

In order to solve the above mentioned problems, according to one aspect of the present invention, there is provided a communication apparatus which comprises: a setting unit configured to set slice information for identifying a type of a network slice in a Flow Label field in a header of a packet compliant with the IPv6 protocol; and a transmitting unit configured to transmit the packet with the header set by the setting unit.

In order to solve the above mentioned problems, according to one aspect of the present invention, there is provided a network management apparatus which comprises: a receiving unit configured to receive a packet compliant with the IPv6 protocol; a determining unit configured to determine a route for the packet based on information in the header of the packet; and a forwarding unit configured to forward the packet according to the determined route, wherein slice information for identifying a type of a network slice is set in a Flow Label field in the header, and the determining unit determines the route based on the slice information.

In the communication apparatus, the determining unit may determine the route based on the slice information and a value of a Differentiated Service Code Point (DSCP) field in a Traffic Class field in the header.

In order to solve the above mentioned problems, according to one aspect of the present invention, there is provided a communication method which comprises: setting slice information for identifying a type of a network slice in a Flow Label field in a header of a packet compliant with the IPv6 protocol; and transmitting the packet with the set header.

According to another aspect of the present invention, there is provided a communication method which comprises: receiving a packet compliant with the IPv6 protocol; determining a route for the packet based on information in the header of the packet; and forwarding the packet according to the determined route, wherein slice information for identifying a type of a network slice is set in a Flow Label field in the header, and the route is determined based on the slice information.

According to another aspect of the present invention, there is provided a control program for causing a computer to execute communication processing, the program causing the computer to execute processing which comprises: a setting process for setting slice information for identifying a type of a network slice in a Flow Label field in a header of a packet compliant with the IPv6 protocol; and a transmitting process for transmitting the packet with the set header.

According to another aspect of the present invention, there is provided a control program for causing a computer to execute communication processing, the program causing the computer to execute processing which comprises: a receiving process for receiving a packet compliant with the IPv6 protocol; a determining process for determining a route for the packet based on information in the header of the packet; and a forwarding process for forwarding the packet according to the determined route, wherein slice information for identifying a type of a network slice is set in a Flow Label field in the header, and the determining process includes determining the route based on the slice information.

ADVANTAGEOUS EFFECT OF THE INVENTION

According to the present invention, it makes it possible to improve a versatility in communicating a type of a network slice in communication systems where network slicing is applied.

BRIEF DESCRIPTION OF DRAWINGS

FIG. 7 is a flowchart of a process performed by the node according to the present embodiment.

DESCRIPTION OF EMBODIMENTS

Figure 1:
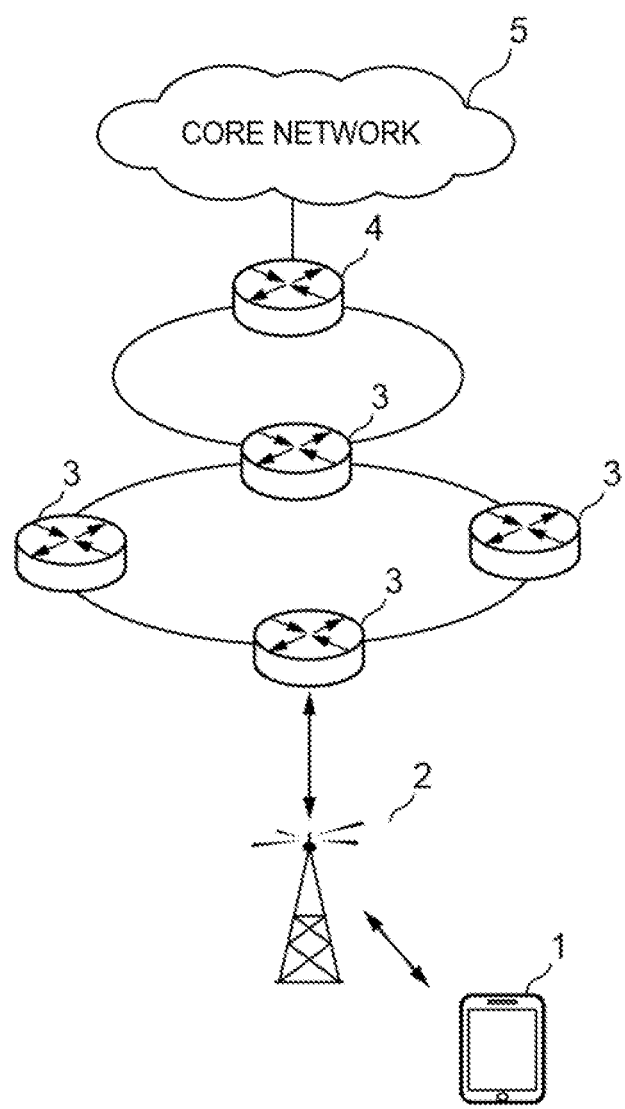
FIG. 1 illustrates an example of a configuration of a communication system according to the present embodiment.

Hereinafter, embodiments of the present invention will be described in detail with reference to the accompanying drawings. Among the constituent elements disclosed below, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

<Configuration of Communication System>

FIG. 1 illustrates an example of a configuration of a communication system according to the present embodiment.

As shown in FIG. 1, the communication system comprises a terminal apparatus 1, a base station, and node (corresponding to a network management apparatuses) 3 and 4 such as routers wherein the node 4 is connected to a core network 5. The communication system according to the present embodiment is configured to be capable of transmitting a packet compliant with the Internet Protocol Version 6 (IPv6).

The terminal apparatus 1 is arranged to be connected to the base station 2, and the base station 2 is arranged to be connected to the node 3. The node 3 is a node located in a first area, and the node 4 is a node located in a second area which is wider than the first area.

In the configuration of the communication system shown in FIG. 1, there are three nodes 3 and one node 4, but the number of the nodes 3 and the nodes 4 is not limited to a specific number. In addition, one or more other nodes (e.g., routers) may be arranged hierarchically in an area smaller or larger than the first area where the node 3 is located or the second area where the node 4 is located.

The terminal apparatus 1 is a communication apparatus that is capable of transmitting a packet (i.e., traffic) containing data and a network slice identifier for indicating a type of network slice requested for the packet. A type of a network slice is described below. The slice identifier may be an identifier such as a Single-Network Slice Selection Assistance Information (S-NSSAI) specified in the Third Generation Partnership Project (3GPP). The terminal apparatus 1 may be referred to as a mobile or fixed user-end devices such as a user equipment (UE), a mobile station (MS), a mobile station device, a mobile terminal, a subscriber unit, a subscriber station, a wireless terminal, and a mobile device. The terminal apparatus 1 also may be a device such as a cellular phone, a smart phone, a personal digital assistant (PDA), a tablet, a laptop, a handheld communication device, and a handheld computing device, a satellite radio, a wireless modem card, a Customer Premises Equipment (CPE).

The base station 2 is a communication apparatus that is capable of adding (or setting) slice information to a header (e.g., a header compliant with the IPv6 protocol) of the packet received from the terminal apparatus 1 and transmit it to the node 3. The slice information is for identifying a type of a network slice. A network slice is described below. It should be noted that the terminal apparatus 1 may be configured to be capable of adding the slice information to the header of the packet.

Figure 2:
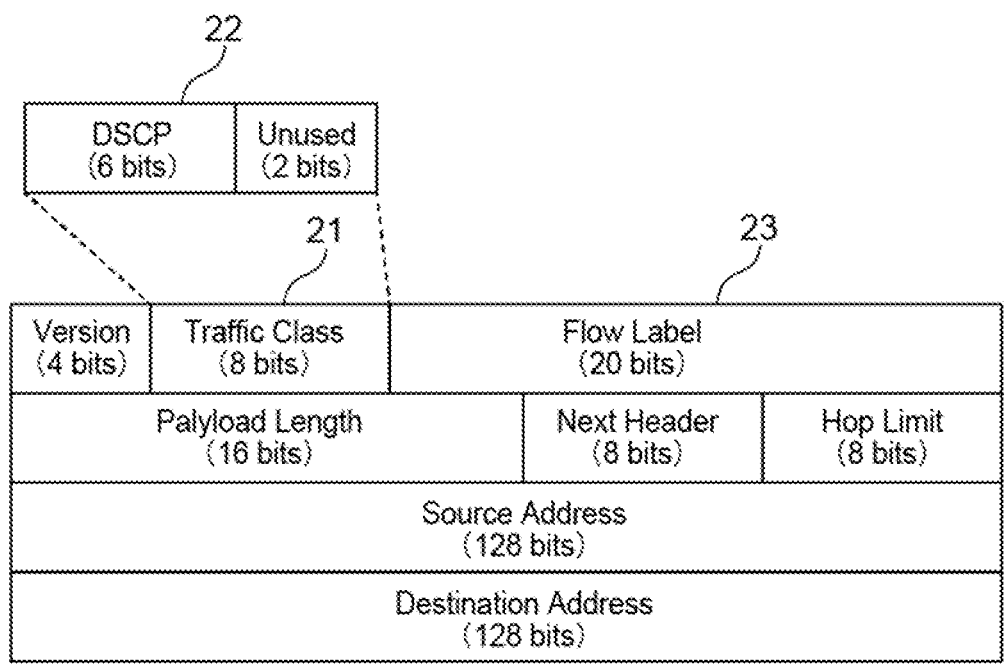
FIG. 2 illustrates a format of the IPv6 header.

FIG. 2 illustrate a format of a header of the packet compliant with the IPv6 protocol (i.e., the IPv6 header). In FIG. 2, a Traffic Class field 21 which consists of 8 bits comprises Differentiated Service Code Point (DSCP) field 22 with 6 bits. The value indicated in the DSCP field 22 (hereinafter, a DSCP value) is a value indicating a priority of packet transmission (hereinafter, priority information). The DSCP value may be set by a telecommunication carrier that manages the base station 2. A Flow Label field 23 is a field that has been introduced in the IPv6 and expected to be used to, for example, ensure a quality of communication routes.

In the present embodiment, the base station 2 (or the terminal apparatus 1) includes slice information for identifying a type of a network slice in the Flow Label field 23 (i.e., marks slice information). The slice information may be information corresponding to the network slice identifier described above. The slice information may also be information set by a telecommunication carrier that manages the base station 2 in correspondence with the network slice identifier.

A type of a network slice is described below. A type of a network slice may be, for example, a mMTC, a URLLC or an eMBB. The mMTC an abbreviation for a massive Machine Type Communication, the URLLC is an abbreviation for Ultra-Reliable and Low Latency Communications, and the eMBB is an abbreviation for an enhanced Mobile Broad Band.

The mMTC is for logistics management, IoT (Internet of Things), smart city/smart home, smart meters, smart sensors, wearable devices, etc.

The URLLC is for smart factories, remote control of robots and drones, smart agriculture, remote surgery, traffic management, automated driving, etc.

The eMBB is for a system for high-definition video distribution, gaming, virtual reality (VR), augmented reality (AR), and free-viewpoint video, ultra-high-density traffic in stadiums, surveillance with high-definition video, etc.

The node 3 analyzes the header of the packet received from the base station 2, determines the optimal communication route to be forwarded to core network 5 based on the information contained in the header, and forwards the packet according to the determined communication route. In the present embodiment, the node 3 is configured to perform forwarding process by using a protocol such as a Segment Routing IPv6 (SRv6), a Segment Routing Multi-Protocol Label Switching (SR-MPLS) or the like.

In the present embodiment, the node 3 determines a communication route based on slice information (i.e., a type of a slice) indicated in the Flow Label field in the header of the received packet. In the example shown in FIG. 1, the node 3 receives a packet from the base station 2 and determines, based on the slice information (i.e., a type of a slice) indicated in the Flow Label field, a communication route to the core network 5 via other nodes 3 (e.g., one or more nodes which are not connected to the base station) or the node 4.

The node 3 also determines links which connect each of the nodes according to the priority indicated by the DSCP value in the header of the received packet. For example, when traffic is congested (e.g., overload), the node 3 may determine, based on the DSCP value, which nodes to keep (i.e., use) and not to use for connecting to the core network 5.

<Functional Configuration of Base Station 2>

Figure 3:
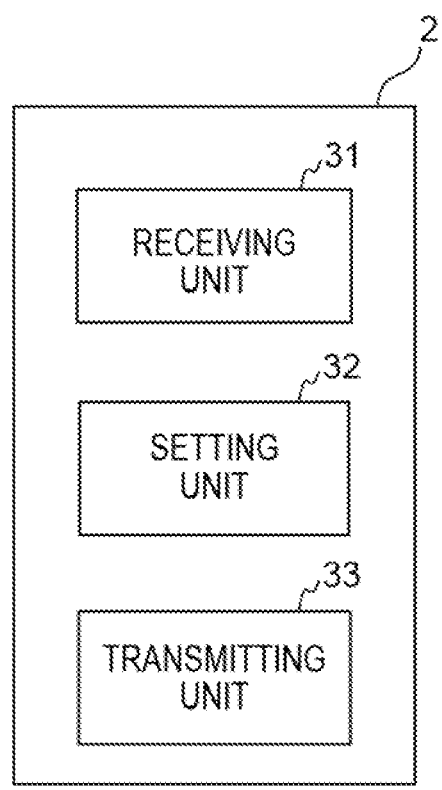
FIG. 3 illustrates an example of a functional configuration of a base station according to the present embodiment.

FIG. 3 illustrates an example of a functional configuration of the base station 2.

The base station 2 comprises, as an example of its functional configuration, a receiving unit 31, a setting unit 32, and a transmitting unit 33.

The receiving unit 31 receives from the terminal apparatus a packet containing data and a slice identifier for indicating a type of a network slice requested. The slice identifier may be the S-NSSAI as described above.

The setting unit 32 sets, according to the slice identifier, the slice information indicating a type of a network slice in a Flow Label field (corresponding to the Flow Label field 23 in FIG. 2) of the received packet. In other words, the setting unit 32 includes the slice information in the Flow Label field. The setting unit my also set the priority information in the DSCP value in the header.

The transmitting unit 33 transmits to the node 3 the packet with the header which has been set by the setting unit 32.

A functional configuration of the terminal apparatus 1 may comprise the setting unit 32 and the transmitting unit 33 as described above.

<Functional Configuration of Node 3>

Figure 4:
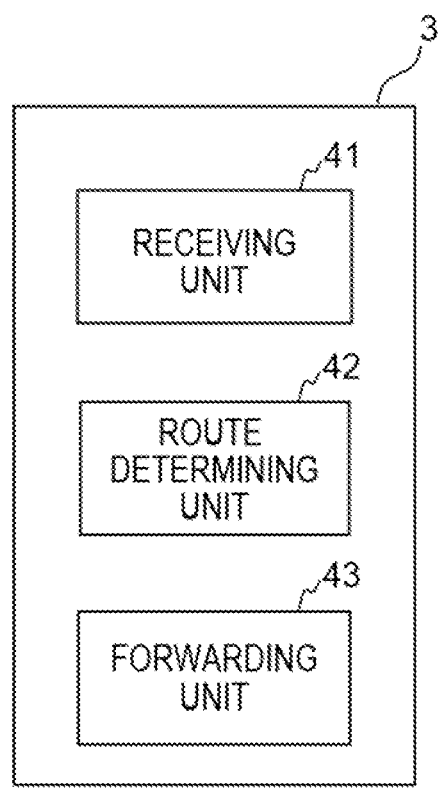
FIG. 4 illustrates an example of a functional configuration of a node according to the present embodiment.

FIG. 4 illustrates an example of a functional configuration of the node (a network management apparatus) 3.

The node 3 comprises, as an example of its functional configuration, a receiving unit 41, a route determining unit 42, and a forwarding unit 43.

The receiving unit 41 receives a packet from the base station 2. The slice information is set in the header of the packet.

The route determining unit 42 analyzes the header of the packet received by the receiving unit 41 and determines the communication route based on the information included in the header (i.e., set in the header). In this embodiment, the route determining unit 42 determines the communication route based on the slice information.

The forwarding unit 43 forwards the packet on the route determined by the route determining unit 42.

In addition, as mentioned above, when traffic is congested, the route determining unit 42 may determine the nodes to be used between each link based on the DSCP value included in the header of the received packet, and the forwarding unit 43 forwards the packet accordingly.

(Hardware Configuration of Communication Apparatus)

Figure 5:
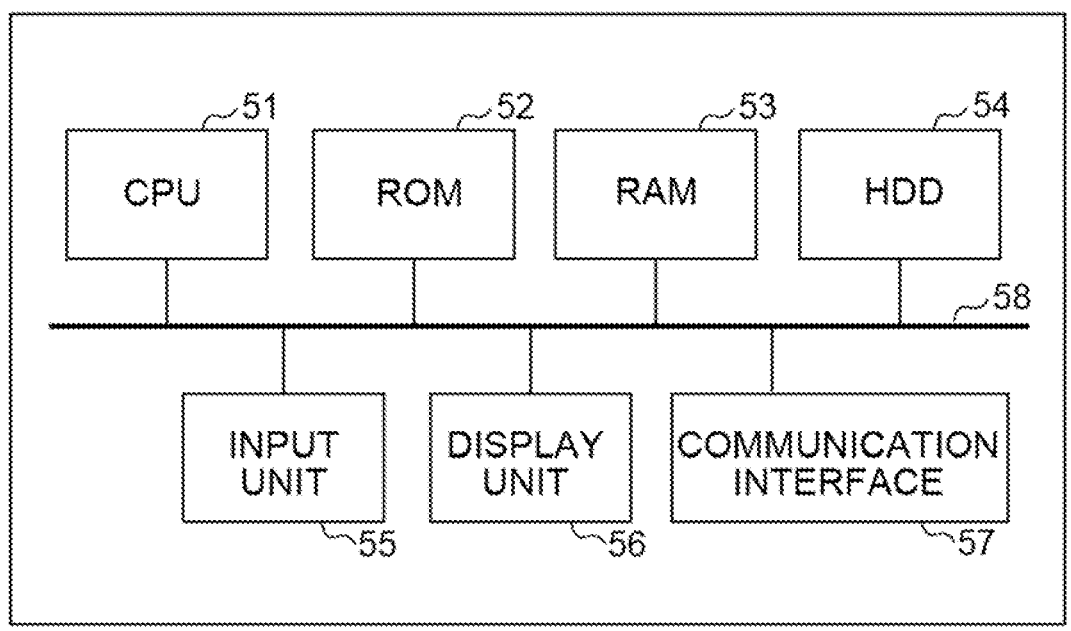
FIG. 5 illustrates an example of a hardware configuration of a communication apparatus according to the present embodiment.

FIG. 5 illustrates a non-limiting example of a hardware configuration of a communication apparatus (i.e., the terminal apparatus 1, the base station 2, and the node 3).

The communication apparatus according to the present embodiment may be implemented on any single or multiple computers or any other processing platform. The communication apparatus may be implemented on a general-purpose server device that is capable of configuring a cloud, or on a dedicated server device.

Referring to FIG. 5, an example of the communication apparatus being implemented on a single computer is shown, while the communication apparatus according to the present embodiment may be implemented on a computer system including a plurality of computers. The plurality of computers may be connected communicatively with each other by a wired or wireless network.

As shown in FIG. 5, the communication apparatus consists of a Central Processing (CPU) 51 and a Read Only Memory (ROM) 52, a Random Access Memory (RAM) 53, a Hard Disc Drive (HDD) 54, an input unit 55, a display unit 56, a communication interface (I/F) 57 and a system bus 58. The communication apparatus 1 may also be equipped with an external memory.

The CPU 51 is for controlling the operation of each of the components (i.e., the components 52 to 57) via the system bus 58 which is a data transmission path to control the overall operation in the communication apparatus.

The ROM 52 is a nonvolatile memory that stores a control program or the like which is necessary for the CPU 51 executing processing. The program may be stored in a non-volatile memory such as the HDD 54, a Solid-State Drive (SSD), or in an external memory such as a removable storage medium (not shown).

The RAM 53 is a volatile memory and functions as the main memory, work area, etc., for CPU 51. In other words, the CPU 51, when executing processing, loads the necessary programs, etc., stored in the ROM 52 onto the RAM 53 and executes the program to realize various functional operations.

The HDD 54 stores, for example, various data, various information, etc., necessary for the CPU 51 executing processing. Also, the HDD 54 stores, for example, various data, various information, etc., obtained through processing by the CPU 51.

The input unit 55 may be composed of a pointing device such a keyboard or a mouse.

The display unit 56 may be composed of a monitor such as a liquid crystal display (LCD). The display 56 may provide a Graphical User Interface (GUI) for inputting, to the communication apparatus, various parameters or communication parameters used in communication with other devices.

The communication I/F 57 is an interface that controls communication between the communication apparatus and external devices.

At least some of the functions of each functional element of the base station 2 of the node 3 shown in FIG. 3 or FIG. 4 may be realized by the CPU 51 executing the program. However, at least some of the functions of each functional element of the base station 2 or the node 3 shown in FIG. 3 or FIG. 4 may be operated as dedicated hardware. In such case, the dedicated hardware operates under the control of the CPU 51.

<Process Flow>

Figure 6:
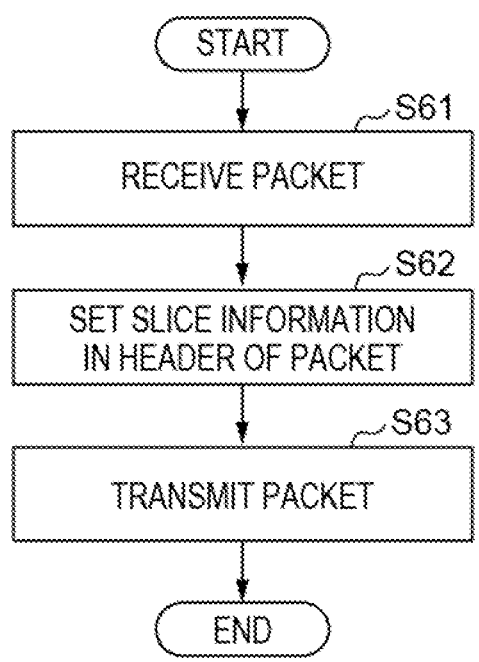
FIG. 6 is a flowchart of a process performed by the base station according to the present embodiment.

FIG. 6 illustrates a flowchart of a process performed by the base station 2.

In S61, the receiving unit 31 receives a packet transmitted from the terminal apparatus 1.

In S62, the setting unit 32 performs setting of the header of the packet received by the receiver 31. In the present embodiment, the setting section 32 sets the slice information in the Flow Label field in the header of the packet. The setting unit 32 may also set the DSCP value in the header. Furthermore, in S62, the setting unit 32 may perform filtering for the DSCP value (i.e., the DSCP field) in order to classify the priorities.

In S63, the transmitting unit 33 transmits the packet with the header which was set by the setting unit to the node 3.

FIG. 7 illustrates a flowchart of a process performed by the node 3.

In S71, the receiving unit 41 receives a packet from the base station 2. The header of the packet includes at least the slice information or the DSCP value.

In S72, the route determining unit 42 analyzes the header of the packet received by the receiving unit 31.

In S73, the route determining unit 42 determines the communication route based on the analysis result including the slice information. In other words, the route determining unit 42 determines the communication route so that communication of the slice type indicated by the slice information will be realized. For example, in a case where the slice type is the eMBB, the route determining unit 42 determines, based on information stored in advance such as communication capacity of links or the like, a communication route so that high-speed communication and large-capacity data transmission will be realized.

In addition, when traffic is congested, the route determining unit 42 determines the nodes to be used between each link based on the DSCP value. For this purpose, the route determining unit 42 may have a function to measure traffic congestion.

In S74, the forwarding unit 43 forwards the packet on the route determined by the route determining unit 42. That is, the forwarding unit 43 designates the path determined by the route determining unit 42 and forwards the packet.

In this way, in the present embodiment, the base station sets independently the slice information for identifying the type of network slice in the Flow Label field of the IPv6 header and transmits it to a node. This enables the node to determine an optimal communication route to realize communication according to the slice type indicated by the slice information, based on the slice information which was acquired by referring to the Flow label field set in the header. Therefore, the use of the Flow Label field makes it possible to notify the slice type with the independent header field without indicating the slice type combined with the transmission control information such as the DSCP value, and thus system versatility will be improved.

While specific embodiments have been described above, the embodiments are illustrative only and are not intended to limit the scope of the invention. The apparatus and method described herein may be embodied in other forms than as described above. In addition, it is also possible to appropriately omit, replace, and change the above-described embodiment without departing from the scope of the present invention. Such omissions, substitutions and alterations fall within the scope of the appended claims and their equivalents and fall within the scope of the present invention.

REFERENCE SIGNS LIST

1: Terminal apparatus, 2: Base station, 3; 4: Node, 5: Core network

What is claimed is:

1. A communication apparatus comprising:
at least one memory configured to store program code; and
electric circuitry including at least one processor, the at least one processor being configured to read and operate according to the program code, the electronic circuitry configured to:
set slice information for identifying a type of a network slice in a Flow Label field in a header of a packet compliant with the IPV6 protocol;
set a value indicating a priority of packet transmission in a Differentiated Service Code Point (DSCP) field of a Traffic Class field of the header; and
transmit the packet with the set header.

2. The communication apparatus of claim 1, wherein the Traffic Class field consists of 8 bits.

3. A network management apparatus comprising:
at least one memory configured to store program code; and
electric circuitry including at least one processor, the at least one processor being configured to read and operate according to the program code, the electronic circuitry configured to:
receive a packet compliant with the IPV6 protocol;
determine a route for the packet based on information in a header of the packet; and
forward the packet according to the determined route, wherein
slice information for identifying a type of a network slice is set in a Flow Label field in the header, and
the determining comprises determining the route based on the slice information and a value of a Differentiated Service Code Point (DSCP) field in a Traffic Class field in the header.

4. The network management apparatus of claim 3, wherein the Traffic Class field consists of 8 bits.

5. A communication method comprising:
setting slice information for identifying a type of a network slice in a Flow Label field in a header of a packet compliant with the IPV6 protocol;
setting a value indicating a priority of packet transmission in a Differentiated Service Code Point (DSCP) field of a Traffic Class field of the header; and
transmitting the packet with the set header.

6. The communication method of claim 5, wherein the Traffic Class field consists of 8 bits.

7. A communication method comprising:
receiving a packet compliant with the IPV6 protocol;
determining a route for the packet based on information in a header of the packet; and
forwarding the packet according to the determined route, wherein
slice information for identifying a type of a network slice is set in a Flow Label field in the header, and
the determining comprises determining the route based on the slice information and a value of a Differentiated Service Code Point (DSCP) field in a Traffic Class field in the header.

8. The communication method of claim 7, wherein the Traffic Class field consists of 8 bits.

9. A control computer program product for causing a computer to execute communication processing, the control computer program causing the computer to execute processing, comprising:
a setting process for setting slice information for identifying a type of a network slice in a Flow Label field in a header of a packet compliant with the IPV6 protocol, and setting a value indicating a priority of packet transmission in a Differentiated Service Code Point (DSCP) field of a Traffic Class field of the header; and
a transmitting process for transmitting the packet with the set header.

10. The control computer program product of claim 9, wherein the Traffic Class field consists of 8 bits.

11. A control computer program product for causing a computer to execute communication processing, the control computer program causing the computer to execute processing, comprising:
- a receiving process for receiving a packet compliant with the IPV6 protocol;
- a determining process for determining a route for the packet based on information in a header of the packet; and
- a forwarding process for forwarding the packet according to the determined route, wherein
- slice information for identifying a type of a network slice is set in a Flow Label field in the header, and
- the determining process includes determining the route based on the slice information and a value of a Differentiated Service Code Point (DSCP) field in a Traffic Class field in the header.

12. The control computer program product of claim 11, wherein the Traffic Class field consists of 8 bits.

* * * * *